(12) United States Patent
Misiak

(10) Patent No.: US 7,390,851 B1
(45) Date of Patent: Jun. 24, 2008

(54) TOUGHENED CYANOACRYLATE COMPOSITIONS

(75) Inventor: Hanns Roland Misiak, Dublin (IE)

(73) Assignee: Loctite (R&D) Limited, Dublin (IE)

( * ) Notice: Subject to any disclaimer, the term of this patent is extended or adjusted under 35 U.S.C. 154(b) by 112 days.

(21) Appl. No.: 11/279,807

(22) Filed: Apr. 14, 2006

Related U.S. Application Data

(63) Continuation-in-part of application No. 11/001,244, filed on Nov. 30, 2004, which is a continuation of application No. 10/336,697, filed on Jan. 6, 2003, now abandoned.

(51) Int. Cl.
*C08L 27/06* (2006.01)

(52) U.S. Cl. .................. 525/193; 524/492; 524/565; 524/568; 525/295

(58) Field of Classification Search ............... 524/492, 524/565, 568; 525/193, 295
See application file for complete search history.

(56) References Cited

U.S. PATENT DOCUMENTS

| | | | |
|---|---|---|---|
| 4,102,945 A | 7/1978 | Gleave | 260/879 |
| 4,440,910 A | 4/1984 | O'Connor | 525/295 |
| 4,444,933 A | 4/1984 | Columbus et al. | 524/292 |
| 4,477,607 A | 10/1984 | Litke | 523/212 |
| 4,533,422 A | 8/1985 | Litke | 156/307 |
| 4,556,700 A | 12/1985 | Harris et al. | 523/209 |
| 4,560,723 A | 12/1985 | Millet et al. | 524/486 |
| 4,622,414 A | 11/1986 | McKervey | 560/61 |
| 4,636,539 A | 1/1987 | Harris et al. | 523/214 |
| 4,695,615 A | 9/1987 | Leonard et al. | 526/194 |
| 4,713,405 A | 12/1987 | Koga et al. | 523/212 |
| 4,718,966 A | 1/1988 | Harris et al. | 156/331.2 |
| 4,855,461 A | 8/1989 | Harris | 549/348 |
| 4,906,317 A | 3/1990 | Liu | 156/307.3 |
| 5,312,864 A | 5/1994 | Wenz | 524/716 |
| 5,340,873 A | 8/1994 | Mitry | 525/10 |
| 5,739,205 A | 4/1998 | Nishino | 524/555 |
| 5,994,464 A | 11/1999 | Ohsawa et al. | 525/85 |
| 6,475,331 B1 | 11/2002 | O'Connor | 156/331 |

*Primary Examiner*—D. S Nakarani
(74) *Attorney, Agent, or Firm*—Steven C. Bauman

(57) ABSTRACT

This invention relates to toughened cyanoacrylate compositions which exhibit improved peel strengths and fixture speeds. The toughened cyanoacrylate compositions include a toughening agent comprising poly(vinychloride-co-vinyl acetate) and poly(methylmethacrytlate).

10 Claims, No Drawings

200
TOUGHENED CYANOACRYLATE COMPOSITIONS

RELATED APPLICATIONS

This application continues in part from co-pending, commonly assigned U.S. patent application Ser. No. 11/001,244, filed Nov. 30, 2004, which itself continues from U.S. patent application Ser. No. 10/336,697, filed Jan. 6, 2003, which has now been abandoned.

BACKGROUND OF THE INVENTION

1. Field of the Invention

This invention relates to toughened cyanoacrylate compositions which exhibit improved peel strengths and fixture speeds. The toughening agent used in the present invention comprises poly(vinychloride-co-vinyl acetate) in combination with poly(methylmethacrytlate).

2. Brief Description of Related Technology

Cyanoacrylate compositions are well known as one component reactive adhesives, quick bonding and suitable for a variety of substrates. However, traditional cyanoacrylate-based adhesives tend to be brittle, and to have low peel strengths. A variety of additives and fillers have been proposed for addition to cyanoacrylate adhesive compositions to improve toughness and peel strengths.

U.S. Pat. No. 4,102,945 (Gleave) describes a cyanoacrylate adhesive having enhanced peel strengths in which a cyanoacrylate is thickened by a copolymer or terpolymer including vinylidene chloride-acrylonitrile copolymers.

U.S. Pat. No. 4,440,910 (O'Connor) is directed to cyanoacrylate compositions having improved toughness, achieved through the addition of elastomers, i.e., acrylic rubbers. These rubbers are either (i) homopolymers of alkyl esters of acrylic acid; (ii) copolymers of another polymerizable monomer, such as lower alkenes, with an alkyl ester of acrylic acid or with an alkoxy ester of acrylic acid; (iii) copolymers of alkyl esters of acrylic acid; (iv) copolymers of alkoxy esters of acrylic acid; and (v) mixtures thereof.

U.S. Pat. No. 4,444,933 (Columbus) suggests the addition of a vinyl chloride/vinyl acetate copolymer to a cyanoacrylate adhesive to reduce adhesion to human skin.

U.S. Pat. No. 4,560,723 (Millet) discloses a cyanoacrylate adhesive composition containing a toughening agent comprising a core-shell polymer and a sustainer comprising an organic compound containing one or more unsubstituted or substituted aryl groups. The sustainer is reported to improve retention of toughness after heat aging of cured bonds of the adhesive.

U.S. Pat. No. 4,713,405 (Koga) discloses an α-cyanoacrylate adhesive composition of matter consisting essentially of α-cyanoacrylate, fumed silica having a surface treated with a dimethyldichlorosilane, and trialkyl borate.

U.S. Pat. No. 5,340,873 (Mitry) discloses a cyanoacrylate adhesive composition having improved toughness by including an effective toughening amount of a polyester polymer derived from a dibasic aliphatic or aromatic carboxylic acid and a glycol.

U.S. Pat. No. 5,739,205 (Nishino) discloses an α-cyanoacrylate adhesive composition which comprises (a) 100 parts by weight of an α-cyanoacrylate compound, (b) 10 through 20 parts by weight of (I) polyalkyl methacrylates having a weight average molecular weight of 100,000 through 300,000, or (II) copolymers of alkyl methacrylates and other methacrylates or acrylates, said copolymers having the same weight average molecular weight as that of the polyalkyl methacrylates (I), (c) 2 through 20 parts by weight of ultrafine anhydrous silicas, and (d) 0.001 through 20 parts by weight of certain quick curing additives, (b)-(d) being on the basis of (a) 100 parts by weight of α-cyanoacrylate compounds.

U.S. Pat. No. 5,994,464 (Oheawa) discloses a cyanoacrylate adhesive composition containing a cyanoacrylate monomer, an elastomer miscible or compatible with the cyanoacrylate monomer, and a core-shell polymers being compatible, but not miscible, with the cyanoacrylate monomer.

U.S. Pat. No. 6,475,331 (O'Connor) discloses and claims a cyanoacrylate adhesive composition comprising: (a) a cyanoacrylate components; and (b) an accelerator component consisting essentially of (i) calixarenes, oxacalixarenes, or a combination thereof, and (ii) at least one crown ether, wherein said composition exhibits a fixturing speed of less than 20 seconds for bonding two substrates, at least one of which is constructed of a material selected from steel, epoxy glass, and balsawood.

Despite the state of the technology, there continues to be a need for cyanoacrylate adhesives with improved toughness and peel strengths, while maintaining a high fixture speed.

SUMMARY OF THE INVENTION

As used herein, all compositions values are given in weight percent unless otherwise noted.

The present invention is directed to, in a first aspect, a cyanoacrylate composition which demonstrates enhanced toughness such as improved peel strength, and fixturing speeds including a cyanoacrylate component; and a toughening agent comprising poly(vinychloride-co-vinyl acetate) ("PVCVA") in combination with poly(methylmethacrytlate) ("PMMA").

Cyanoacrylate compositions in accordance with the present invention containing PVCVA in combination with PMMA show increased toughness, measured for instance as an increased peel strength.

In another aspect, the present invention is directed to a cyanoacrylate composition which demonstrates enhanced toughness including a cyanoacrylate material; a toughening agent comprising PVCVA in combination with PMMA; and one or more additives selected from plasticizers, accelerators, fillers, opacifiers, inhibitors, thixothrophy conferring agents, stabilizers, dyes, thermal degradation reducers, and combinations thereof, where upon cure, the cyanoacrylate composition has an average T peel strength on mild steel of more than about 3 N/mm after curing at room temperature for about 72 hours and a fixture speed on EPDM-foam rubber of less than 40 seconds.

In yet another aspect, the present invention is directed to a method of bonding two or more substrates including the steps of providing at least two substrates; dispensing, on at least a portion of a surface of one or both of the at least two substrates, a cyanoacrylate composition including about 1 to about 20% by weight of the toughening agent comprising PVCVA in combination with PMMA; contacting the surfaces of the at least two substrates having the cyanoacrylate composition therebetween; and curing the cyanoacrylate composition.

In still another aspect, the present invention is directed to a bonded assembly including: a first substrate having a first surface; another substrate having a second surface; and a cured cyanoacrylate composition disposed between the first and second surfaces, the composition having included prior to cure a cyanoacrylate component; and a toughening agent comprising about 1 to about 20% by weight of PVCVA in combination with PMMA. Preferably, the T peel strength on mild steel is greater than about 3 N/mm after room temperature cure for about 72 hours, and fixture speed on EPDM rubber of less than 40 seconds.

DETAILED DESCRIPTION OF THE INVENTION

The cyanoacrylate compositions of the present invention include toughening agents which provide enhanced toughness, such as improved peel strengths in the cured compositions. The toughening agent comprises PVCVA in combination with PMMA. A method of bonding substrates and the resultant bonded assembly are disclosed herein as well.

The cyanoacrylate compositions of the present invention include a cyanoacrylate component which include cyanoacrylate monomers, such as those represented by the structure:

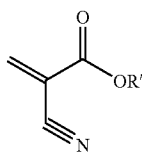

where $R^1$ is selected from $C_{1-16}$ alkyl, alkoxyalkyl, cycloalkyl, alkenyl, aralkyl, aryl, allyl and haloalkyl groups. Preferably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methyoxyethyl cyanoacrylate and combinations thereof. A particularly desirable cyanoacrylate monomer is ethyl-2-cyanoacrylate. The cyanoacrylate component should be included in the compositions in an amount within the range of about 70% by weight to about 90% by weight, preferably about 75% by weight to about 85% by weight.

The compositions of the present invention may also contain additives such as stabilizers, accelerators, plasticizers, fillers, opacifiers, inhibitors, thixotrophy conferring agents, dyes, fluorescence markers, thermal degradation reducers, adhesion promoters, and combinations thereof, and the like. These additives are known to those of skill in the art.

The cyanoacrylate monomers (and the compositions in which the cyanoacrylate monomers are used) are preferably stabilized using acid stabilizers of the Lewis or protonic types although combinations of nonvolatile sulfonic acids with gaseous stabilizers such as NO, $SO_2$, $SO_3$, $BF_3$, $CO_2$ and HF can provide a synergistic effect. A preferred stabilizer system for the present invention includes methane sulfonic acid ("MSA") and $SO_2$. Preferably, the amount of MSA is about 5 to about 25 ppm and a preferred amount of $SO_2$ is about 2 to about 30 ppm based on the amount of the cyanoacrylate monomer. More preferably, $BF_3$, another acidic gaseous stabilizer, may also be added in amounts of about 5 ppm to about 50 ppm based on the amount of the cyanoacrylate monomer. Advantageously, such small amounts of stabilizers used with the compositions of the present invention provide optimal performance without stability concerns.

Inhibitors or free radical scavengers that may be useful in the cyanoacrylate compositions are of the phenolic type such as hydroquinone, t-butyl catechol, p-methoxy-phenol, and the like. A preferred inhibitor of the present invention is hydroquinone,. The inhibitor is present in an amount of about 0.001% by weight to about 2.0% by weight, preferably about 0.02% to about 0.5% by weight. Other inhibitors suitable for use herein include butylated hydroxytoluene and butylated hydroxyanisole.

Accelerators that may be useful in the cyanoacrylate compositions include for example calixarenes, oxacalixarenes, and combinations thereof. Of the calixarenes and oxacalixarenes, many are known, and are reported in the patent literature. See e.g. U.S. Pat. Nos. 4,556,700, 4,622,414, 4,636,539, 4,695,615, 4,718,966, and U.S. Pat. No. 4,855,461, the disclosures of each of which are hereby expressly incorporated herein by reference.

Another potentially useful accelerator component is a crown ether. A host of crown ethers are known. For instance, examples which may be used herein either individually or in combination, or in combination with the calixarenes and oxacalixarenes described above include 15-crown-5, 18-crown-6, dibenzo-18-crown-6, benzo-15-crown-5, dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Other suitable accelerators include those described in U.S. Pat. No. 5,312,864 (Wenz), which are hydroxyl group derivatives of an α-, β- or γ-cyclodextrin which is at least partly soluble in the cyanoacrylate; in U.S. Pat. No. 4,906,317 (Liu), which are silacrown compounds to accelerate fixturing and cure on de-activating substrates such as wood, examples of which are within the following structure:

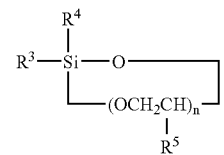

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups such as methoxy, and aryloxy groups such as phenoxy. The $R^3$ and $R^4$ groups may contain halogen or other substitutents, an example being trifluoropropyl. However, groups not suitable as $R^4$ and $R^5$ groups are basic groups such as amino, substituted amino and alkylamino.

Specific examples of silacrown compounds useful in the inventive compositions include:

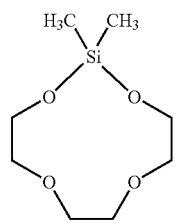

dimethylsila-11-crown-4;

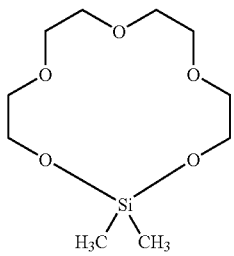

dimethylsila-14-crown-5;

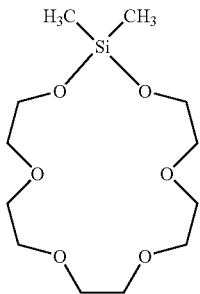

and dimethylsila-17-crown-6.

The accelerator component should be included in the compositions in an amount within the range of from about 0.01% to about 10% by weight, with the range of about 0.05% to about 2% by weight being desirable, and about 0.1% to about 1% by weight of the total composition being particularly desirable.

Phthalic anhydride may also be added to the cyanoacrylate component to further aid in durability and impact, heat, and moisture resistance.

Plasticizers may also be added to the cyanoacrylate component, and when so added are preferably present in an amount of about 25% by weight to about 50% by weight, more preferably about 10% by weight to about 25% by weight of the total composition.

The inventive compositions may also be rendered thixotropic by the addition of thixoprophy conferring agents, such as fumed silica. See U.S. Pat. No. 4,533,422 (Litke) and U.S. Pat. No. 4,477,607 (Litke). These agents, when used, should be used in an amount less than about 15% by weight, such as within the range of about 0.5% by weight to about 10% by weight of the total composition.

The combination of the cyanoacrylate monomer and the additives will be referred to herein as the cyanoacrylate component.

The cyanoacrylate compositions of the present invention are typically cured using an anionic mechanism. The layer of moisture inherently adsorbed on the surfaces of virtually all materials is sufficient to initiate polymerization of the cyanoacrylate component. Further, most substrates also contain alkaline or nucleophilic ingredients or as impurities which can initiate the anionic polymerization. The hydroxyl groups of the water molecules effectively act to initiate polymerization as carbanions are generated at a rapid rate. The polymerization reaction will continue until all available monomer is consumed or until growth is inhibited by an acidic species.

As noted, the toughening agent of the present invention comprises PVCVA in combination with PMMA.

The inventive cyanoacrylate compositions are readily prepared by adding predetermined amounts of the toughening agent components to the cyanoacrylate component and stirring or agitating for a sufficient time at an appropriate temperature to achieve a homogeneous solution or suspension. Typically, temperatures much above room temperature are not necessary, though in formulations containing high levels of fillers, thickeners, and the like, moderate heating may be desirable to speed dissolution of the various additives.

The cyanoacrylate compositions of the present invention are useful in bonding two or more substrates. A sufficient portion of the composition may be placed on a surface of one of the two or more substrates. The other substrate is then positioned adjacent to the cyanoacrylate composition and the two substrates are placed in contact to one another to form an assembly, upon curing of the cyanoacrylate. Unexpectedly, typical fixturing speeds of the cyanoacrylate compositions of the present invention for bonding EPDM rubber were less than about 40 seconds.

The improved toughness of the cured compositions of this invention is manifested through various physical properties, such as 180° peel strength. High peel strengths are indicative of tough bonds. Peel strength was determined in accordance with American Standard Test Method (ASTM) No. D-903-49, the substance of which is hereby expressly incorporated herein by reference.

The present invention may be better understood through consideration of the following examples which are intended to be illustrative rather than limiting.

EXAMPLES

The following examples describe the preparation and use of the cyanoacrylate compositions of the present invention. These examples are presented for the purpose of further illustrating and explaining the invention, and are not to be taken as limiting the scope of the invention.

It was found that the addition of PVCVA to cyanoacrylate monomer significantly increases the T peel strength of the cured cyanoacrylate composition, if PMMA is present as well. Cured cyanoacrylate compositions are typically rigid, brittle materials, having low crack resistance and therefore low T peel strength. In order to modify these physical properties, additives may be included as noted herein.

A toughening agent is the focus of the examples in which a series of cyanoacrylate compositions was prepared by agitation/mixing/tumbling a closed vessel to obtain a homogenous dispersion or solution of the cyanoacrylate composition. Peel strengths were evaluated by bonding flexible steel strips together and curing for 24 hours at a temperature of 25° C. The force required to cause the bond to fail was measured, the results being presented in units of force per unit length of bond. The peel test procedure was performed according to ASTM D-903-49. The fixture time was also measured, with shorter fixture times required to develop a bond on EPDM rubber samples, generally being preferred.

Certain of these compositions and test results therefor are presented below in Table I.

TABLE I

| Composition | Peel Strength [N/mm] | EPDM [s] | Remark |
|---|---|---|---|
| 01 EtCA | 0.4 | | control |
| 02 LOCTITE 424 | 0.4 | | control |
| 03 LOCTITE 380 | 2.9 | 120 | control |
| 04 LOCTITE 480 | 4.1 | 75 | control |
| 05 EtCA + 7.5% PVeneCAN | 2.3 | | |
| 06 EtCA + 9% PVeneCAN | 3.3 | 20 | |
| 07 EtCA + 10% PVeneCAN | 2.9 | 30 | |
| 08 EtCA + 15% PVeneCAN | 2.5 | | |
| 09 EtCA + 20% PVeneCAN | 2.1 | | |
| 10 EtCA + 30% PVeneCAN | 0.5 | | |
| 11 EtCA + 10% PVeneCAN + 0.4% Calix. | 3.1 | 22 | |
| 12 EtCA + 9% PVeneCAN + 4% PMMA | 2.8 | | |
| 13 EtCA + 9% PVeneCAN + 3% Silica | 3.2 | | |
| 14 EtCA + 9% PVeneCAN + 4% Silica | 3.4 | | |
| 15 EtCA + 11% PVeneCAN + 3% Silica | 3.1 | | |
| 16 EtCA + 11% PVeneCAN + 6% Silica | 3.6 | | |
| 17 EtCA + 9% PVeneCAN + 4% BzBuPht | 2.9 | | |
| 18 EtCA + 9% PVeneCAN + 4% GTA | 3.6 | | |
| 19 EtCA + 9% PVeneCAN + 4% nBuCA | 2.6 | | |
| 20 Loctite 424 + 10% PVeneCAN | 4.2 | | |
| 21 Loctite 431 + 5% PVeneCAN | 1.3 | 17 | After 1/2 yr: 30s; 1.68 N/mm |
| 22 Loctite 431 + 5% PVeneCAN + 4% Silica | 1.6 | 18 | After 1/2 yr: 24s; 3.61 N/mm |
| 23 Loctite 431 + 9% PVeneCAN + 4% Silica | 3.7 | 28 | |
| 24 EtCA + 10% PVCVA(I) | 1.3 | | |
| 25 EtCA + 10% PVCVA(II) | 1.4 | | |
| 26 EtCA + 10% PVCVA(III) | 1.1 | | |
| 27 EtCA + 15% PVCVA(III) | 1.1 | | |
| 28 EtCA + 20% PVCVA(III) | 0.7 | | |
| 29 Loctite 431 + 5% PVeneCAN + 5% PVCVA(III) | 2.2 | | |
| 30 {Loctite 431 + EtCA [1:1]} + 4.5% PVeneCAN | 2.1 | 26 | After 1/2 yr: 32s; 1.67 N/mm |
| 31 {Loctite 431 + EtCA [1:1]} + 4.5% PVeneCAN + 4% Silica | 4.8 | 28 | After 1/2 yr: 30s; 3.99 N/mm |
| 32 EtCA + 7% PVeneCAN + 5% PMMA + 2.75% Silica | 5.4 | 35 | |
| 33 EtCA + 7% PVeneCAN + 5% PMMA + 2.75% Silica + 4% GTA | 5.6 | 40 | |
| 34 EtCA + 7% PVeneCAN + 5% PMMA + 2.75% Silica + 4% TEAC | 5.0 | 40 | |
| 35 IPrCA + 10% PVeneCAN | 2.1 | 50 | |
| 36 IPrCA + 10% PVeneCAN + 4% Silica | 2.6 | 60 | After1/2 yr: 65s; 3.48 N/mm |
| 37 Loctite 431 + 10% PVCVA(III) | 1.99 | 12 | |
| 38 Loctite 431 + 10% PVCVA(II) + 3% Silica | 0.96 | 18 | |
| 39 {Loctite 431/EtCA [19:3]} +6% PVCVA(II) + 3% Silica | 2.36 | 17 | |

BzBuPht = Benzyl butyl phtalate
Calix = Calixarene derivative (fixture speed accelerator)
EPDM = Fixture time on EPDM foam rubber cord
EtCA = Ethylcylancecrylate monomer
GTA = Glycerol triacetate
IPrCA = Iso-Propyl cyanoecrylate monomer
nBuCA = nButyl cyanoecrylate momomer
Peel Strength = Peel Strength on degreased mild steel
PMMA = Polymerylmethacrylate (thickening agent)
PVCVA(I) = Poly(vinylchloride-co-vinyl acetate), 86% vinylchloride
PVCVA(II) = Poly(vinylchloride-co-vinyl acetate), 90% vinylchloride
PVCVA(III) = Poly(vinylchloride-co-vinyl acetate), 81% vinylchloride
PVeneCAN = Poly(vinylidene chloride-co-acrylonitrile), 20% acrylonitrile
TEAC = Trieltryl-O-acetyl citrate The substrates used in determining T peel strength in Table I are sand blasted steel bonded to sand blasted, flexible steel shims. Unexpectedly, typical fixture speeds of the cyanoacrylate compositions of the present invention for these substrates were less than about 70 seconds, and in most cases, from 12-40 seconds.

Non-toughened cyanoacrylate compositions that are evaluated in adhesive applications have low T peel strengths, typically from about 0.2-0.4 N/mm. Samples 01 and 02 illustrate the low peel strengths of such non toughened cyanoacrylate compositions.

The cyanoacrylate compositions of the present invention exhibit improved T peel strengths in comparison with cyanoacrylate compositions toughened with known tougheners, such as BLACK MAX® (Loctite® 380 cyanoacrylate adhesive, an adhesive known for its high peel strength).

In Table II, twenty six of the twenty seven samples are based on ethyl cyanoacrylate, whereas the twenty seventh (Sample AA) is based on isopropyl ester cyanoacrylate. Samples A-D are used as controls, with Sample A being an ethyl ester control with no PMMA or PVCVA. Samples B-D are commercially available products that report a toughness property.

The substrates used in determining T peel strength in Tables II and III are aluminium bonded to aluminium and mild steel bonded to mild steel.

TABLE II

| Sample | PMMA | PVCVA (% by wt.) | Amt. of VA in PVCVA+ (% by wt.) |
|---|---|---|---|
| A | 0.0 | 0.0 | — |
| B* | 0.0 | 0.0 | — |
| C** | 0.0 | 0.0 | — |
| D*** | 0.0 | 0.0 | — |

TABLE II-continued

| Sample | PMMA | PVCVA (% by wt.) | Amt. of VA in PVCVA+ (% by wt.) |
|---|---|---|---|
| E | 12.0 | 0.0 | — |
| F | 0.0 | 10.0 | 12% VA ("063" from SP2) |
| G | 0.0 | 10.0 | 10% VA ("068" from SP2) |
| H | 0.0 | 20.0 | 19% VA (grade from Polysciences) |
| I | 12.0 | 10.0 | 12% VA ("063" from SP2) |
| J | 12.0 | 10.0 | 10% VA ("068" from SP2) |
| K | 12.0 | 15.0 | 11% VA ("Vinnol 11/59" from Wacker) |
| L | 7.5 | 7.5 | 11% VA ("Vinnol 11/59" from Wacker) |
| M | 5.0 | 2.5 | 11% VA ("Vinnol 11/59" from Wacker) |
| N | 7.5 | 2.5 | 11% VA ("Vinnol 11/59" from Wacker) |
| O | 10.0 | 2.5 | 11% VA ("Vinnol 11/59" from Wacker) |
| P | 12.5 | 2.5 | 11% VA ("Vinnol 11/59" from Wacker) |
| Q | 5.0 | 5.0 | 11% VA ("Vinnol 11/59" from Wacker) |
| R | 7.5 | 5.0 | 11% VA ("Vinnol 11/59" from Wacker) |
| S | 10.0 | 5.0 | 11% VA ("Vinnol 11/59" from Wacker) |
| T | 5.0 | 7.5 | 11% VA ("Vinnol 11/59" from Wacker) |
| U | 2.5 | 10.0 | 11% VA ("Vinnol 11/59" from Wacker) |
| V | 5.0 | 10.0 | 11% VA ("Vinnol 11/59" from Wacker) |
| W | 2.5 | 12.5 | 11% VA ("Vinnol 11/59" from Wacker) |
| X | 10.0 | 3.0 | 11% VA ("Vinnol 11/59" from Wacker) |
| Y | 6.5 | 6.5 | 11% VA ("Vinnol 11/59" from Wacker) |
| Z | 3.0 | 10.0 | 11% VA ("Vinnol 11/59" from Wacker) |
| AA | 10.0 | 2.5 | 11% VA ("Vinnol 11/59" from Wacker) |

*LOCTITE ® 480
**CYBERBOND 2241
***DEVCON HV1200
+Commercial source of vinyl acetate noted

TABLE III

| Sample | T peel strength [N/mm] Al | T peel strength [N/mm] MS* | Fixture Speed (ees) EPDM |
|---|---|---|---|
| A | 0.0 | 0.2 ± 0.2 | 6 |
| B | 2.7 ± 0.4 | 3.6 ± 0.5 | 45 |
| C | 2.6 ± 0.5 | 3.5 ± 0.5 | 45 |
| D | 2.0 ± 0.1 | 1.8 ± 0.3 | 40 |
| E | 0.3 ± 0.2 | 0.4 ± 0.3 | — |
| F | — | 0.6 ± 0.4 | — |
| G | — | 0.7 ± 0.3 | — |
| H | — | 0.7 ± 0.3 | — |
| I | — | 1.4 ± 0.2 | 4 |
| J | — | 4.8 ± 0.6 | 13 |
| K | — | 2.5 ± 0.2 | 24 |
| L | 1.8 ± 0.34 | 4.9 ± 0.3 | 20 |
| M | — | 3.1 ± 0.5 | — |
| N | — | 2.9 ± 0.2 | — |
| O | 1.2 ± 0.1 | 4.1 ± 0.3 | 24 |
| P | — | 2.9 ± 0.2 | — |
| Q | — | 3.4 ± 0.6 | 21 |
| R | — | 3.4 ± 0.6 | 21 |
| S | — | 2.8 ± 0.8 | — |
| T | — | 3.1 ± 0.2 | — |
| U | 1.7 ± 0.5 | 4.5 ± 0.3 | 22 |
| V | — | 3.3 ± 0.1 | — |
| W | — | 3.3 ± 0.3 | — |
| X | — | 2.5 ± 0.6 | — |
| Y | 1.3 ± 0.2 | 2.3 ± 0.6 | 14 |
| Z | — | 1.8 ± 0.2 | — |
| AA | — | 1.7 ± 0.4 | — |

*mild steel

As is evident from a review of the information presented in the tables above, neither cyanoacrylate monomers themselves, nor the presence of either PMMA or PVCVA, result in the development of an appreciable T peel strength after curing on EDPM rubber substrates. (See e.g. Samples A and E-H of Tables II and III.)

More specifically, Sample E demonstrates the effect of adding PMMA to an ethyl cyanoacrylate monomer. Virtually no effect is seen on added peel strength over the ethyl cyanoacrylate monomer used as a control.

However, when the PMMA and PVCVA are together presented in a cyanoacrylate formulation, T peel strength measurements show a significant increase. (See e.g. Samples I-W and AA.)

Samples X-Z contain the thixotrophy agent, silica, at a 3.5% by weight level.

What is claimed is:

1. A cyanoacrylate composition comprising:
    a cyanoacrylate component; and
    a toughening agent comprising poly(vinychloride-co-vinyl acetate) in combination with poly(methylmethacrylate).

2. The composition of claim 1 wherein said cyanoacrylate component comprises a monomeric structure represented by:

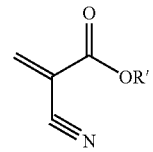

wherein $R^1$ is $C_{1-15}$ alkyl, alkoxyalkyl, cycloalkyl, alkenyl, aryl, aralkyl, allyl, alkylhalide, or haloalkyl and mixtures thereof.

3. The composition of claim 2 wherein said cyanoacrylate component comprises a member selected from the group consisting of methyl cyanoacrylate, ethyl-2-cyanoacrylate, propyl cyanoacrylate, butyl cyanoacrylates, octyl cyanoacrylates, allyl cyanoacrylates, β-methoxyethyl cyanoacrylate, and mixtures thereof.

4. The composition of claim 3 wherein said cyanoacrylate component comprises ethyl-2-cyanoacrylate.

5. The composition of claim 1 wherein said poly(vinychloride-co-vinyl acetate) is present in an amount of about 1% to about 20% by weight.

6. The composition of claim 1 further comprising fumed silica.

7. The composition of claim 6, wherein said fumed silica is present in an amount (by weight) of from about 0.5 to about 10%.

8. The composition of claim 1 further comprising at least one additive selected from the group consisting of stabilizers, accelerators, plasticizers, fillers, opacifiers, thickeners, viscosity modifiers, inhibitors, thixotrophy conferring agents, dyes, thermal degradation inhibitors, and combinations thereof.

9. The composition of claim 1 wherein upon cure, the cyanoacrylate composition has an average peel strength in excess of about 1.0 N/mm after 72 hours at room temperature cure.

10. A cyanoacrylate composition consisting essentially of:
    a cyanoacrylate component;
    a toughening agent comprising poly(vinychloride-co-vinyl acetate) in combination with poly(methylmethacrylate); and
    one or more additives selected from the group consisting of stabilizers, accelerators, plasticizers, fillers, opacifiers, thickeners, viscosity modifiers, inhibitors, thixotrophy conferring agents, dyes, thermal degradation inhibitors, and combinations thereof, wherein upon cure, the cyanoacrylate composition has an average tensile shear strength in excess of about 1.0 N/mm.

* * * * *